US012393403B2

United States Patent
Roy et al.

(10) Patent No.: US 12,393,403 B2
(45) Date of Patent: Aug. 19, 2025

(54) RPA DEVELOPMENT ACCELERATION USING DSL VALIDATOR

(71) Applicant: International Business Machines Corporation, Armonk, NY (US)

(72) Inventors: Sujoy Roy, Kolkata (IN); Rajib Das, Kolkata (IN); Priyankar Malakar, Kolkata (IN); Radha Mohan De, Howrah (IN); Indrajit Kanjilal, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 18/341,275

(22) Filed: Jun. 26, 2023

(65) Prior Publication Data
US 2024/0427563 A1 Dec. 26, 2024

(51) Int. Cl.
*G06F 8/30* (2018.01)
(52) U.S. Cl.
CPC .................... *G06F 8/31* (2013.01)
(58) Field of Classification Search
CPC .................... G06F 8/30; G06F 8/31
USPC ................ 717/101–115, 136–137
See application file for complete search history.

(56) References Cited

U.S. PATENT DOCUMENTS

| 8,707,263 | B2* | 4/2014 | Osenkov | G06F 11/3698 717/124 |
| 11,036,937 | B2* | 6/2021 | Bernelas | G06F 40/211 |
| 11,334,828 | B2* | 5/2022 | Negulescu | G06Q 10/06316 |
| 11,433,536 | B2 | 9/2022 | Berg et al. | |
| 11,704,095 | B2* | 7/2023 | Mani | G06F 9/541 717/107 |
| 2021/0342124 | A1 | 11/2021 | Cote et al. | |

OTHER PUBLICATIONS

Meixner, K., Rinker, F., Marcher, H., Decker, J., & Biffl, S. (Sep. 7, 2021). A domain-specific language for product-process-resource modeling. In 2021 26th IEEE International Conference on Emerging Technologies and Factory Automation (ETFA) (pp. 1-8). IEEE.

(Continued)

*Primary Examiner* — Ted T. Vo
(74) *Attorney, Agent, or Firm* — Tutunjian & Bitetto, P.C.; Andre L. Adkins

(57) ABSTRACT

A method includes preparing key actions in a process design document (PDD) from historical PDD documents by tokenizing the PDD with part-of-speech (POS) grammar against key verbs and phrases, extracting automation unit pairs from the historical process documents to map the automation unit pairs with the key verbs and phrases, constructing a set of automation tasks against one or more of the key verbs and phrases, coupling different process models with domain verbs for the phrases to mark one or more of the automation unit pairs as actions against one or more of the key verbs, constructing a tree-like mapping where each key action points to different actions in a target specific automation language, and defining a vocabulary interface of a domain specific language (DSL) by using the key actions and phrases.

20 Claims, 8 Drawing Sheets

(56) References Cited

OTHER PUBLICATIONS

Dwarakanath, A., Era, D., Priyadarshi, A., Dubash, N., & Podder, S. (Mar. 13, 2017). Accelerating test automation through a domain specific language. In 2017 IEEE International Conference on Software Testing, Verification and Validation (ICST) (pp. 460-467). IEEE.

Han, X., Hu, L., Dang, Y., Agarwal, S., Mei, L., Li, S., & Zhou, X. (Jan. 5, 2020). Automatic business process structure discovery using ordered neurons LSTM: a preliminary study. arXiv preprint arXiv:2001.01243.

Prud'hommeaux, E., Labra Gayo, J. E., & Solbrig, H. (Sep. 4, 2014). Shape expressions: an RDF validation and transformation language. In Proceedings of the 10th International Conference on Semantic Systems (pp. 32-40).

The Process Definition Document (Apr. 29, 2021) Robocorp https://robocorp.com/docs/courses/implementing-rpa-robots/process-definition-document.

Hyun, Y., Lee, D., Chae, U., Ko, J., & Lee, J. (Nov. 12, 2021). Improvement of business productivity by applying robotic process automation. Applied sciences, 11(22), 10656.

* cited by examiner

RPA DEVELOPMENT ACCELERATION USING DSL VALIDATOR

BACKGROUND

The present invention relates generally to robotic process automation (RPA), and more specifically, to RPA development acceleration with a process document by using a domain specific language (DSL) validator.

Creating accurate and up-to-date process definition documentation (PDD) for robotic process automation (RPA) is a tedious task. The manual process involves consultants spending several hours with operators, subject matter and process experts to understand the process and identify the gaps. Next, the consultants document their observations and communicate with stakeholders via multiple emails, which is not an efficient way of collaboration. Such siloed and disconnected documents and communication are easily lost. Also, since these email communications happen in sequential order as stakeholders gather all the requirements and context that goes into PDD in sequence, there is an undesired delay.

SUMMARY

In accordance with an embodiment, a method for is provided. The method includes preparing key actions in a process design document (PDD) from historical PDD documents by tokenizing the PDD with part-of-speech (POS) grammar against key verbs and phrases, extracting automation unit pairs from the historical process documents to map the automation unit pairs with the key verbs and phrases, constructing a set of automation tasks against one or more of the key verbs and phrases, coupling different process models with domain verbs for the phrases to mark one or more of the automation unit pairs as actions against one or more of the key verbs, constructing a tree-like mapping where each key action points to different actions in a target specific automation language, and defining a vocabulary interface of a domain specific language (DSL) by using the key actions and phrases In accordance with another embodiment, a computer program product for implementing robotic process automation (RPA) acceleration is provided, the computer program product comprising a computer readable storage medium having program instructions embodied therewith. The program instructions are executable by a computer to cause the computer to prepare key actions in a process design document (PDD) from historical PDD documents by tokenizing the PDD with part-of-speech (POS) grammar against key verbs and phrases, extract automation unit pairs from the historical process documents to map the automation unit pairs with the key verbs and phrases, construct a set of automation tasks against one or more of the key verbs and phrases, couple different process models with domain verbs for the phrases to mark one or more of the automation unit pairs as actions against one or more of the key verbs, construct a tree-like mapping where each key action points to different actions in a target specific automation language, and define a vocabulary interface of a domain specific language (DSL) by using the key actions and phrases.

In accordance with yet another embodiment, a system for implementing robotic process automation (RPA) acceleration is provided. The system includes a memory and one or more processors in communication with the memory configured to prepare key actions in a process design document (PDD) from historical PDD documents by tokenizing the PDD with part-of-speech (POS) grammar against key verbs and phrases, extract automation unit pairs from the historical process documents to map the automation unit pairs with the key verbs and phrases, construct a set of automation tasks against one or more of the key verbs and phrases, couple different process models with domain verbs for the phrases to mark one or more of the automation unit pairs as actions against one or more of the key verbs, construct a tree-like mapping where each key action points to different actions in a target specific automation language, and define a vocabulary interface of a domain specific language (DSL) by using the key actions and phrases.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
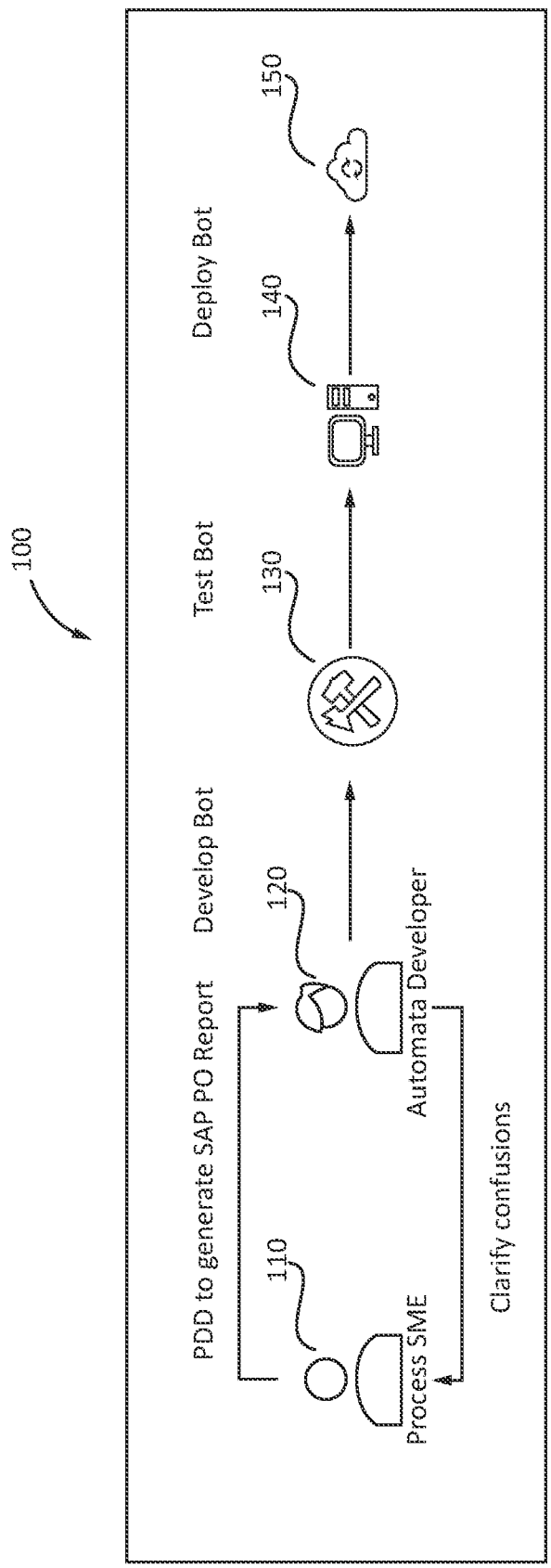
FIG. 1 is a block/flow diagram of a sequence of actions taken by an automata developer to generate a purchase order.

Embodiments in accordance with the present invention provide methods and systems for employing robotic process automation (RPA) development acceleration with a process document by using a domain specific language (DSL) validator. Automation holds great promise for enterprises that rely on rapid, streamlined processes to gain efficiency and deliver better experiences to customers and employees. There are many paths and possible entry points, from standalone software solutions to extreme automation platforms designed to deliver digitally transformed, technology-driven information technology (IT) and business processes.

One technology that continues to receive a lot of attention is RPA. RPA is a way to introduce automation and gain business benefits at low cost with near-zero risk. A software "robot" or "bot" replicates routine human-computer interaction to automate repetitive tasks. RPA bridges the gap between manual interaction and full automation. RPA is particularly appealing where IT resources and budgets are limited, or for working with back-end applications that lack good application programming interfaces (APIs) and would be difficult to automate without significant change to the system. However, to deploy RPA wisely, it helps to understand the technology's benefits and limitations, how to expand its evolving capabilities, and the value RPA brings.

Business teams deliver business specific process documents to techno-functional experts to validate the same and start developing implementation of desired process flows or transform an existing process for improvements. However, this process of validating the business process documentation happens to be arduous and time consuming, since numerous ambiguities or obscurities may be included in the descriptive process documentations, unless it comes from a controlled method.

The exemplary embodiments of the present invention introduce a validator, built with DSL, to enhance such validation and synchronization mechanism of the business process document by using artificial intelligence (AI) and machine learning (ML) based methods, within its implementation system. The exemplary embodiments of the present invention further disclose a novel technique for generating an RPA entity from templated content of a process design document (PDD). An AI model generated out of historical knowledge corpus that understands industry specific terms and business models can mediate the process of converting the PDD content to a structured automation step. In the meantime, another method consumes the output business processes from the earlier method to selectively pick automation unit steps in chosen automation languages to give shape to a complete business process workflow.

The mediator plays the role of PDD validator and continuously syncs the changes in the PDD by its author or any process modelling tools. When changes occur in the PDD, the RPA generator interface intercepts it to bring the AI model to validate the changes. If the changes are incongruent or incompatible with the DSL standard or other industry standard, the system raises a red flag to those portions of the PDD and further suggests probable right contents to accept by the author if the same appears semantically correct to the author in terms of what he/she wanted to add as a change or modification. In an additional embodiment, the system and method captures user feedback to use for continuous learning purposes for providing better services in the future.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a block/flow diagram of a sequence of actions taken by an automata developer to generate a purchase order.

Robotic process automation (RPA) software is an advanced tool of technology that makes it easy to develop, deploy, and control software bots that mimic human activities and communicate with digital systems and software. In general, RPA is similar to a bot doing such works at a higher rate when compared to a manual workforce. Software bots are designed in a way to perform faster and more consistently than humans, without having to stand up and stretch or sip a cup of coffee. They are even capable of logging into apps, entering data, opening emails and attachments, counting tasks, finishing tasks, and then logging out. RPA streamlines workflows, which makes organizations more profitable, flexible, and responsive. RPA also increases employee satisfaction, engagement, and productivity by removing mundane tasks from their workdays.

Referring back to FIG. 1, in a conventional system 100, a bot needs to be created to generate a purchase order from a system applications and products (SAP) system to replace manual effort. The sequence of actions for the automata developer are as follows.

A process subject matter expert (SME) 110 works with an automata developer 120 to develop a bot. After the bot is developed, the bot is tested by a bot tester 130. If the developed bot passes the testing phase, then the bot can be deployed by a bot deployer 140. The developed bot can be deployed to the cloud 150 of an organization. The automata developer 120 can collaborate with the process SME 110 to receive clarifications on how the process works. In this example, the process can be generating a purchase order (PO).

The PDD in this case would include, e.g., the following steps to visualize the sequence of actions in the current manual method:

Login to SAP graphical user interface (GUI) App using credential xx/yy.

Enter TCODE ME23.

Enter PO Number.

Click on the report icon.

Generate the report for the required time period.

Download the report in PDF format.

Send the PDF report.

The steps are legible for a seasoned SAP practitioner, while the bot developer 120 may not have ample familiarity in SAP. Thus, lots of back-and-forth communications are required for removing ambiguities for the bot developer 120. SAP GUI App, Login Steps, TCODE, PO, are a few of the silos.

The process SME 110 is the person who possesses a deep understanding of a particular subject. The subject in question can be anything, such as a job, department, function, process, piece of equipment, software solution, material, historical information, and more. Subject matter experts may have collected their knowledge through intensive levels of schooling, or through years of professional experience with the subject. The SME has a level of understanding regarding their subject that is not common knowledge, making the person quite valuable to an organization. Subject matter experts are especially important in process improvement efforts. They often have a great deal of process knowledge that's not documented. They also can save a person or organization time by identifying inadequate solutions proposed by other members of the team during the solution selection stage of the project.

The automata developer 120 is an RPA developer working in an industry to assist with implementing RPA workflows for different practices. In this instance, the automata developer 120 can be assigned a task to develop a bot for generating a purchase order (PO). Of course, one skilled in the art can contemplate employing the automata developer 120 to develop any type of bot for any type of purpose. An RPA developer is a developer who works on designing, building, and implementing RPA machines and systems. RPA developers are responsible for designing automation tasks for organizations and also for solving automation based problems or issues faced by the organizations. The main responsibilities of an RPA developer are to design, develop, and implement software robots, or bots, to work alongside humans to enhance business process efficiency. RPA developers interact with people (e.g., SMEs) from various domains to understand their business challenges and find ways to streamline their processes through automating tedious, mind-numbing tasks. Business users request automation for repetitive processes so that they can have time to work on more creative initiatives. As an RPA developer, it's important to ask the business users for all the requirement scenarios, positive and negative, and service-level agreements. This helps the RPA developer create effective automation solutions. The role requires understanding the process that needs to be automated, checking the feasibility of automating that particular process, and, if it makes sense to do so, designing and developing the future state of that process. The term RPA developer can used interchangeably with the term automata developer.

Figure 2:
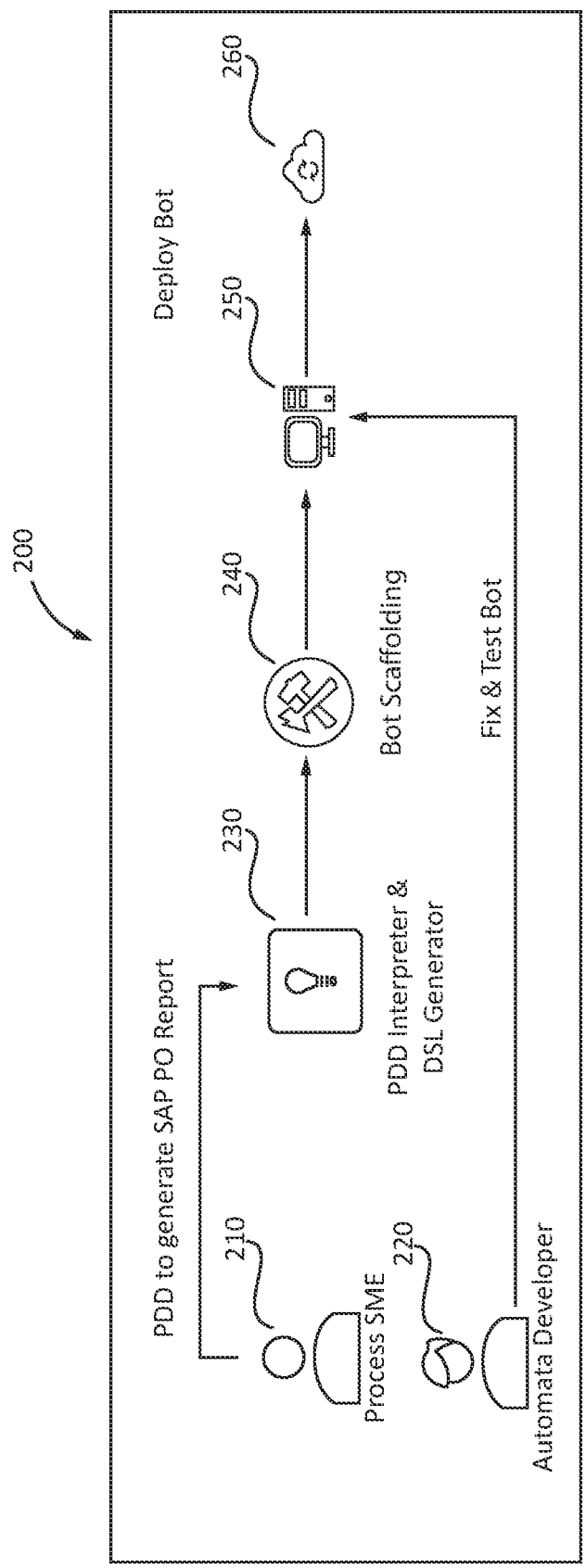
FIG. 2 is a block/flow diagram of an exemplary sequence of actions taken by an automata developer to generate a purchase order by employing a process design document (PDD) interpreter and domain specific language (DSL) generator, in accordance with an embodiment of the present invention.

FIG. 2 is a block/flow diagram of an exemplary sequence of actions taken by an automata developer to generate a purchase order by employing a process design document (PDD) interpreter and domain specific language (DSL) generator, in accordance with an embodiment of the present invention.

The exemplary system 200 utilizes a process SME 210 who employs a PDD interpreter and DSL generator 230. After, the PDD interpreter and DSL generator 230 is employed, the developed bot is tested with bot scaffolding 240. After the testing phase is complete, the developed bot is deployed by a bot deployer 250. The automata developer 220 does not interact with the process SME 210. Instead, the automata developer 220 enters the process at the bot deployment stage. The bot deployer 240 deploys the developed bot to the cloud 260 of an organization. It is noted that the PDD to generate the SAP purchase order (PO) report is provided by the process SME 210 directly to the PDD interpreter and DSL generator 230.

The exemplary embodiment thus bridges the gap between expert cross skills, which instead uses the PDD interpreter and DSL generator 230 to present the above sequences in the bot developer's own manner, as listed below.

```
DEFINE AUTOMATA (Params: reportPath, ponum,
    period)
OPEN WINAPP [exe="sapgui.exe",pre-
    req="sapguisetup.msi",path="prefetched"]
WINDOW_SCREEN_INPUT [title="Login",
    fields={user:xx, password:yy}]
MOUSE_KEYB_INTERRUPT (key="ENTER")
CHECK_SUCCESS (success_screen_title="Enter Trans-
    action Code", raise_alert_exit="OnMismatch")
WINDOW_SCREEN_INPUT [title="Enter Transaction
    Code", fields={tcode: ME23}]
MOUSE_KEYB_INTERRUPT (key="ENTER")
CHECK_SUCCESS (success_screen_title="Enter PO
    Number", raise_alert_exit="OnMismatch")
WINDOW_SCREEN_INPUT [title="Enter PO Num-
    ber", fields={ponumber:param("ponum")}]
MOUSE_KEYB_INTERRUPT (key="ENTER")
CHECK_SUCCESS (success_screen_title="Generate
    Report", raise_alert_exit="OnMismatch")
LOCATE_CLICK_SCREEN_ELEMENT (type="icon",
    value="Report", clicktype="single")
CHECK_SUCCESS (success_screen_title="Enter Report
    Period", raise_alert_exit="OnMismatch")
WINDOW_SCREEN_INPUT [title="Enter Report
    Period", fields={from:param("period:start"), to:param
    ("period:end")}]
MOUSE_KEYB_INTERRUPT (key="ENTER")
CHECK_SUCCESS (success_screen_title="Report
    Ready For Donwload",
    raise_alert_exit="OnMismatch")
LOCATE_CLICK_SCREEN_ELEMENT (type="icon",
    value="Download", clicktype="single", isStore=true,
    store_path=param ("reportPath"))
CHECK_FILE_STORAGE_SUCCESS (file=param ("re-
    portPath"), raise_alert exist="OnMisMatch")
RETURN FILE[filePAth-param("reportPath")]

END AUTOMATA
```

As seen in the above, the resultant structure removed the element of confusion from the requirement itself and created a detailed PSEUDOCODE-like structure from the knowledge corpus created earlier from historical PDD documents and subsequent coding constructs. Moreover, this resultant structure is directly related to the automation verb/action but there is no dependency on target automata technology. Thus, writing a generator for a target automata technology is easy, that is, provide the implementation for the automata verb/action and generate appropriate automata code for a specific technology. This can significantly accelerate the automata build cycle and provide augmented assistance to the automata developer, multiple times faster than the conventional system described in FIG. 1.

The exemplary embodiments of the present invention thus disclose a novel method to accelerate RPA development with business specific PDDs using a DSL based validator. The exemplary method presents a synchronizer between the RPA and the PDD, so that when either of them changes by the owner, the DSL validator works as a base reference of the domain specific business process.

The Process Definition Document (PDD) outlines the business process chosen for automation using RPA technology. The document describes the sequence of steps performed as part of the business process, the conditions and rules of the process prior to automation and how they are envisioned to work after automating it, partly or entirely. This specifications document serves as a base for developers, providing such developers with the details needed for applying robotic automation to the selected business process.

Once a process has been identified as a good candidate to be automated, it is time to document the process in detail. This documentation then serves as the basis for implementing the software robot that takes over and handles the process in the future.

During this requirements gathering phase, the software robot developer needs to work in close contact with the business side to get familiar with the current process and the business domain in which it is executed. This often means sitting next to the user when the process is run, asking all relevant questions, and exploring all possible cases.

The results of this analysis phase are collected in a document referred to as a PDD, which is then shared with all the relevant people involved, approved, and signed off.

Stated differently, a PDD is the representation of "AS-IS" business processes that are chosen for RPA. The PDD document outlines the sequence of steps that constitute the end to end process, the rules, exceptions handling of manual processes, and the envisioned process after partial or complete automation. Developers refer to the PDD when building robots that automate the desired process.

As noted, in FIG. 2, such PDD documents are provided by the process SME 210 directly to the PDD interpreter and DSL generator 230, without direct communication between the process SME 210 and the automata developer 220.

Figure 3:
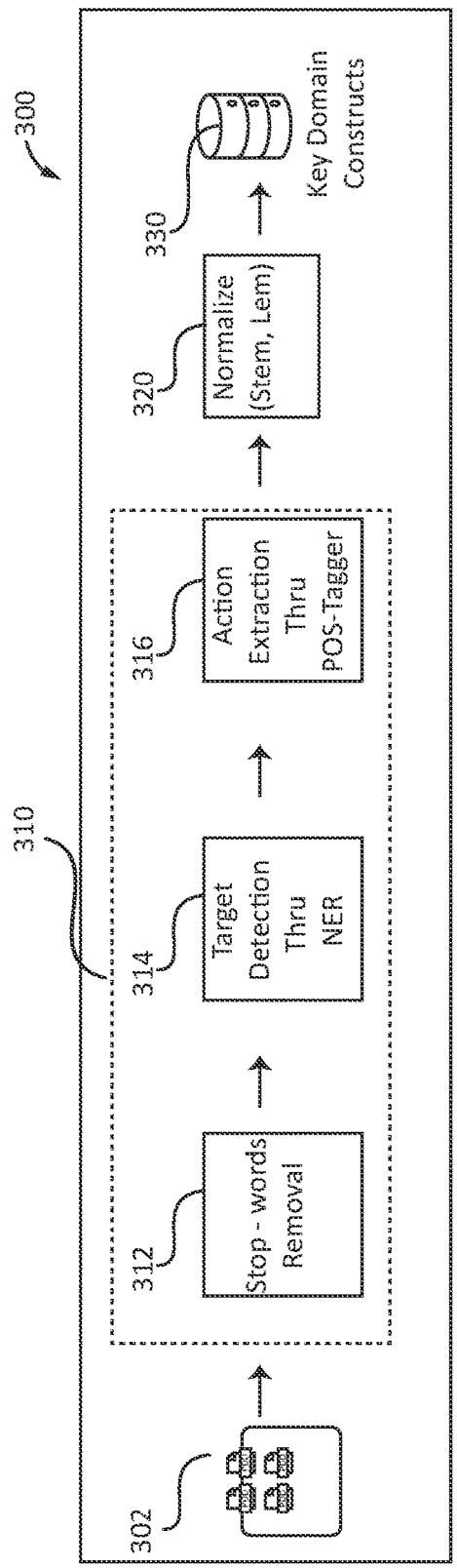
FIG. 3 is a block/flow diagram depicting a first phase of the PDD processing pipeline where PDD ingestion and automation requirement vocabulary construction takes place, in accordance with an embodiment of the present invention.

FIG. 3 is a block/flow diagram depicting a first phase of the PDD processing pipeline where PDD ingestion and automation requirement vocabulary construction takes place, in accordance with an embodiment of the present invention.

In the first phase 300, the PDD documents 302 are fed into a PDD processing pipeline 310. The PDD processing pipeline 310 has a component 312 for stop-words removal. After the stop-words removal is completed, target detector 314 enables target detection through NER.

Then an action extractor 316 achieves action extraction through a part-of-speech (POS)-tagger. POS tagging is a natural language processing (NLP) process which refers to categorizing words in a text (corpus) and correspondence with a particular part of speech, depending on the definition of the word and its context. In simple terms, POS tagging is a task of labelling each word in a sentence with its appropriate part of speech. POS tagging can also be referred to as grammatical tagging. It is already known that parts of speech include nouns, verb, adverbs, adjectives, pronouns, conjunction and their sub-categories. A POS is a grammatical classification that commonly includes the verbs, adjectives, adverbs, nouns, etc. Most of the POS tagging falls under Rule Base POS tagging, Stochastic POS tagging and Transformation based tagging.

Once the PDD processing pipeline 310 is complete, the output is normalized by a PDD document normalizer 320 and the data is stored in a key domain constructs database 330. Phase 1 can be referred to as the PDD ingestion and automation requirement vocabulary construction phase.

Figure 4:
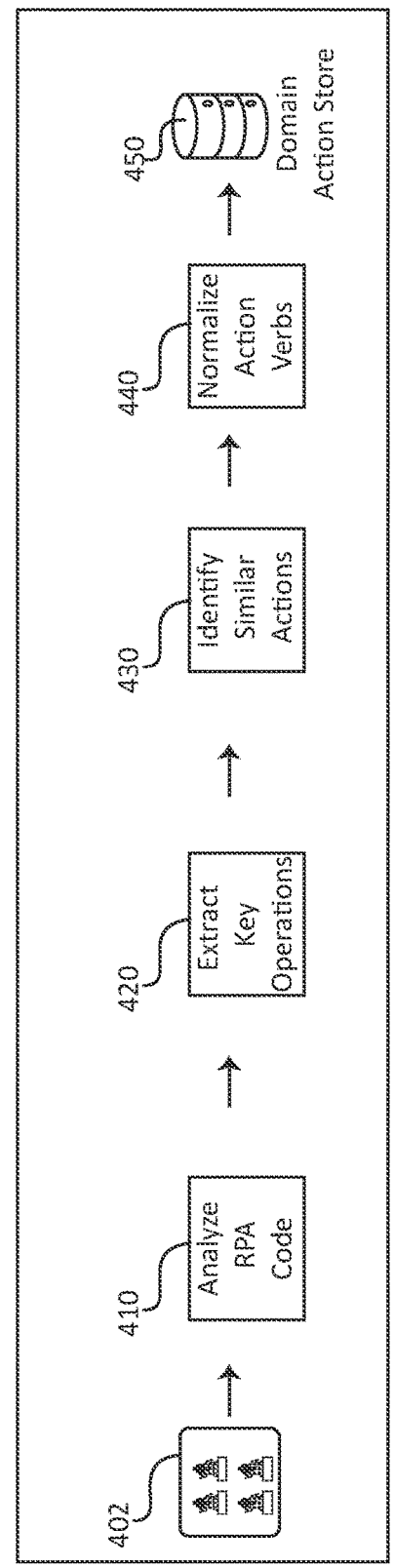
FIG. 4 is a block/flow diagram depicting a second phase of the PDD processing pipeline where RPA code ingestion and automation action vocabulary construction takes place, in accordance with an embodiment of the present invention.

FIG. 4 is a block/flow diagram depicting a second phase of the PDD processing pipeline where RPA code ingestion and automation action vocabulary construction takes place, in accordance with an embodiment of the present invention.

In the second phase 400, the bots 402 developed by the bot developer are analyzed by an analyzer 410, which analyzes the RPA code. Then the output is forwarded to an extractor 420, which extracts key operations. An action identifier 430 is then employed to identify similar actions. The data is then normalized by normalizer 440, which analyzes various actions. The actions are part of the speech, which includes nouns, verb, adverbs, adjectives, pronouns, conjunction and their sub-categories. Then the output is stored in a domain action store database 450. Phase 2 can be referred to as the RPA code ingestion and automation action for vocabulary construction phase.

Figure 5:
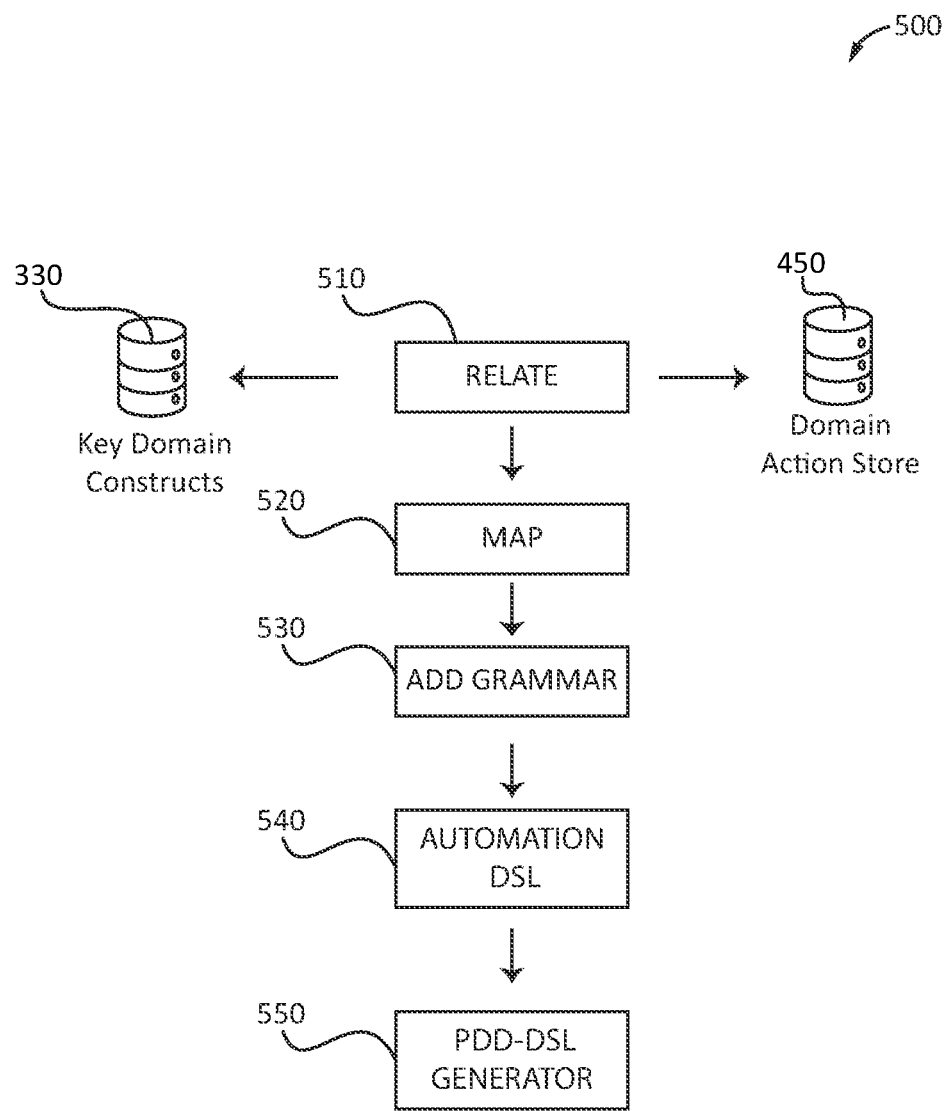
FIG. 5 is a block/flow diagram depicting a third phase of the PDD processing pipeline for enabling PDD to DSL transformation, in accordance with an embodiment of the present invention.

FIG. 5 is a block/flow diagram depicting a third phase of the PDD processing pipeline for enabling PDD to DSL transformation, in accordance with an embodiment of the present invention.

In the third phase 500, a relationship 510 is developed or established between the key domain constructs database 330 and the domain action store database 450. The relationship 510 is mapped as a relationship map 520. Grammar 530 is then added. The output is provided to an automation DSL component 540, which, in turn, provides the data to a PDD-DSL generator 550. Phase 3 can be referred to as a phase for enabling PDD to DSL transformation.

Figure 6:
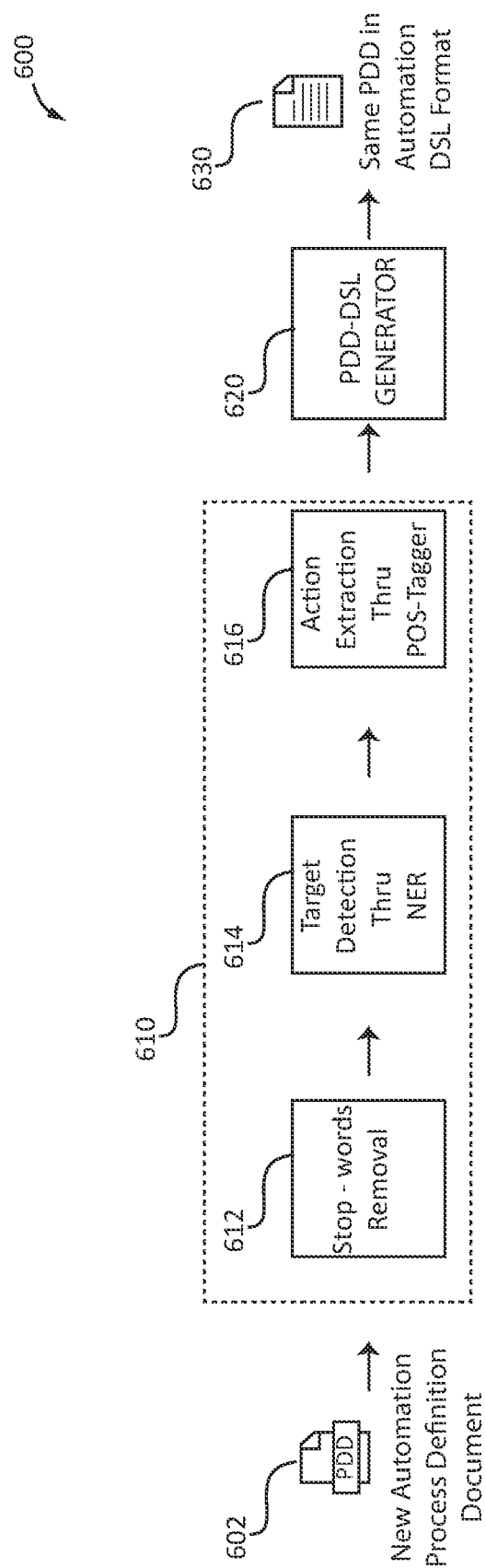
FIG. 6 is a block/flow diagram depicting a fourth phase of the PDD processing pipeline for generating a DSL PDD from PDD documents, in accordance with an embodiment of the present invention.

FIG. 6 is a block/flow diagram depicting a fourth phase of the PDD processing pipeline for generating a DSL PDD from PDD documents, in accordance with an embodiment of the present invention.

In the fourth phase 600, the new automation process definition document 602 goes through a process pipeline 610, which includes a component 612 for stop-words removal. After the stop-words removal is completed, target detector 614 enables target detection through NER. Then an action extractor 616 achieves action extraction through a part-of-speech (POS)-tagger.

The output is provided to a PDD-DSL generator 620, which, in turn, creates or generates a same PDD 630 in automation DSL format. Phase 4 can be referred to as a phase for generating a DSL-PDD from a PDD document.

It is noted that RPA is a software robot that mimics human actions, whereas artificial intelligence (AI) is a simulation of human intelligence by machines. According to IEEE SA, RPA refers to the use of a "preconfigured software instance that uses business rules and predefined activity choreography to complete the autonomous execution of a combination of processes, activities, transactions, and tasks in one or more unrelated software systems to deliver a result or service with human exception management." According to IEEE SA, AI is "the combination of cognitive automation, machine learning (ML), reasoning, hypothesis generation and analysis, natural language processing and intentional algorithm mutation producing insights and analytics at or above human capability." The exemplary methods have been contemplated in the realm of RPA.

Therefore, according to FIGS. 2-6, one component of the exemplary method is preparing key actions in a process description from historical process documents by tokenizing the process description with standard part-of-speech (POS) grammar against key verbs and phrases.

A second component of the exemplary method is extracting automation unit pairs from process definition documents, used in the RPA, to map them with collected key verbs and phrases from the first component, which is used for constructing a set of automation task sets against one or more keys and phrases.

A third component of the exemplary method explores different process models in various traditional and well-known automation platforms to couple them with domain verbs for phrases to mark one or more automation units, along with their implementation details, as actions against one or more verbs. The result is a tree-like mapping where each key word/action in the requirement landscape points to different actions in the target specific automation language.

A fourth component of the exemplary method uses the collected keys and phrases from the above components to define a vocabulary interface of the DSL, by employing the following steps:

Standardize key actions and create a DSL representation by converting the actions to standard DSL verbs like ACCESS APPLICATION, LOGIN, INPUT, CLICK, ENTER etc.

Standardize the key inputs and define the DSL NOUNS (Operand) accordingly.

Analyze complex logical flow within RPA codes and form DSL conditional operators to handle the same from requirement perspective, e.g., CLICK IF SELECTION IS PRESENT.

A translator combines outputs of the first and second components to transform a requirement into a corresponding DSL format.

The transformed DSL format of the requirement uses a DSL vocabulary interface to yield the RPA implementation details (as codes or as set of process or as process model) for a given implementation platform.

An RPA generator consumes outputs of the steps in the fourth component to achieve an intended RPA from the DSL format of the given business requirements.

A validator is triggered for any changes within the PDD, either by the author or through output of any process mining tools.

The validator flags any discrepancies or failures to transform the process definition to DSL based on the RPA generator instructions.

A change is suggested by the validator to modify the PDD with acceptable and complaint content, which the author may use to continue the RPA generation or skip the non-compliant portion from the PDD.

RPA reviewer feedback is then collected by the exemplary method to use for continuous learning and improving of the transformation of the PDD by the RPA implementation process.

Figure 7:
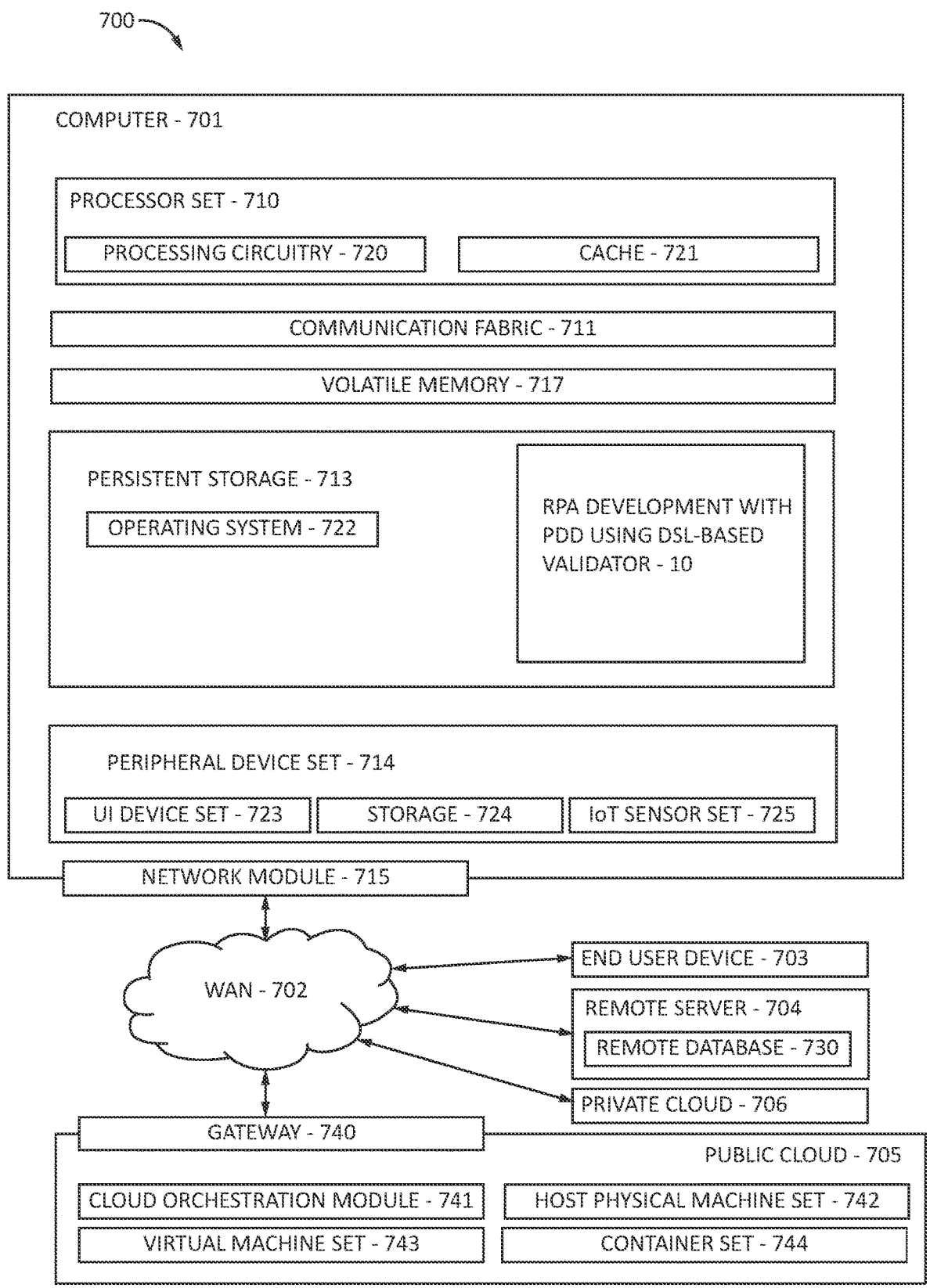
FIG. 7 is a block diagram of an exemplary computer system to apply the RPA development with PDD by using a DSL-based validator, in accordance with an embodiment of the present invention.

FIG. 7 is a block diagram of an exemplary computer system to apply the RPA development with PDD by using a DSL-based validator, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is usually moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as the RPA development with PDD by using a DSL-based validator 10. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile.

In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Figure 8:
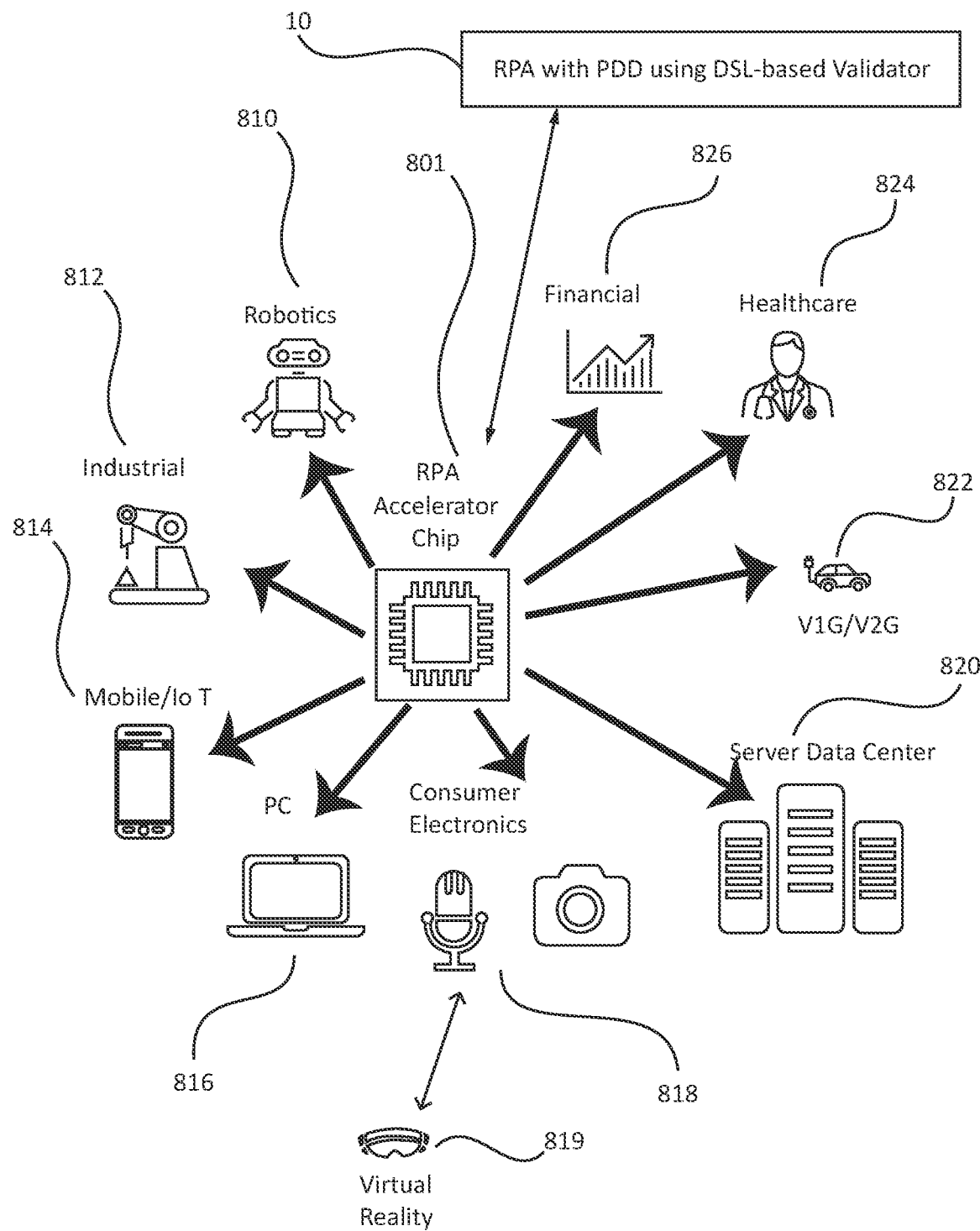
FIG. 8 illustrates practical applications for employing the RPA development with PDD by using a DSL-based validator via an RPA accelerator chip, in accordance with an embodiment of the present invention.

FIG. 8 illustrates practical applications for employing the RPA development with PDD by using a DSL-based validator via an RPA accelerator chip, in accordance with an embodiment of the present invention.

The RPA accelerator chip 801 can implement the RPA development with PDD by using a DSL-based validator 10, and can be used in a wide variety of practical applications, including, but not limited to, robotics 810, industrial applications 812, mobile or Internet-of-Things (IoT) 814, personal computing 816, consumer electronics 818, including virtual reality (VR) applications 819, server data centers 820, vehicle-to-grid (V2G) applications 822, healthcare applications 824, and financial applications 826.

Figure 9:
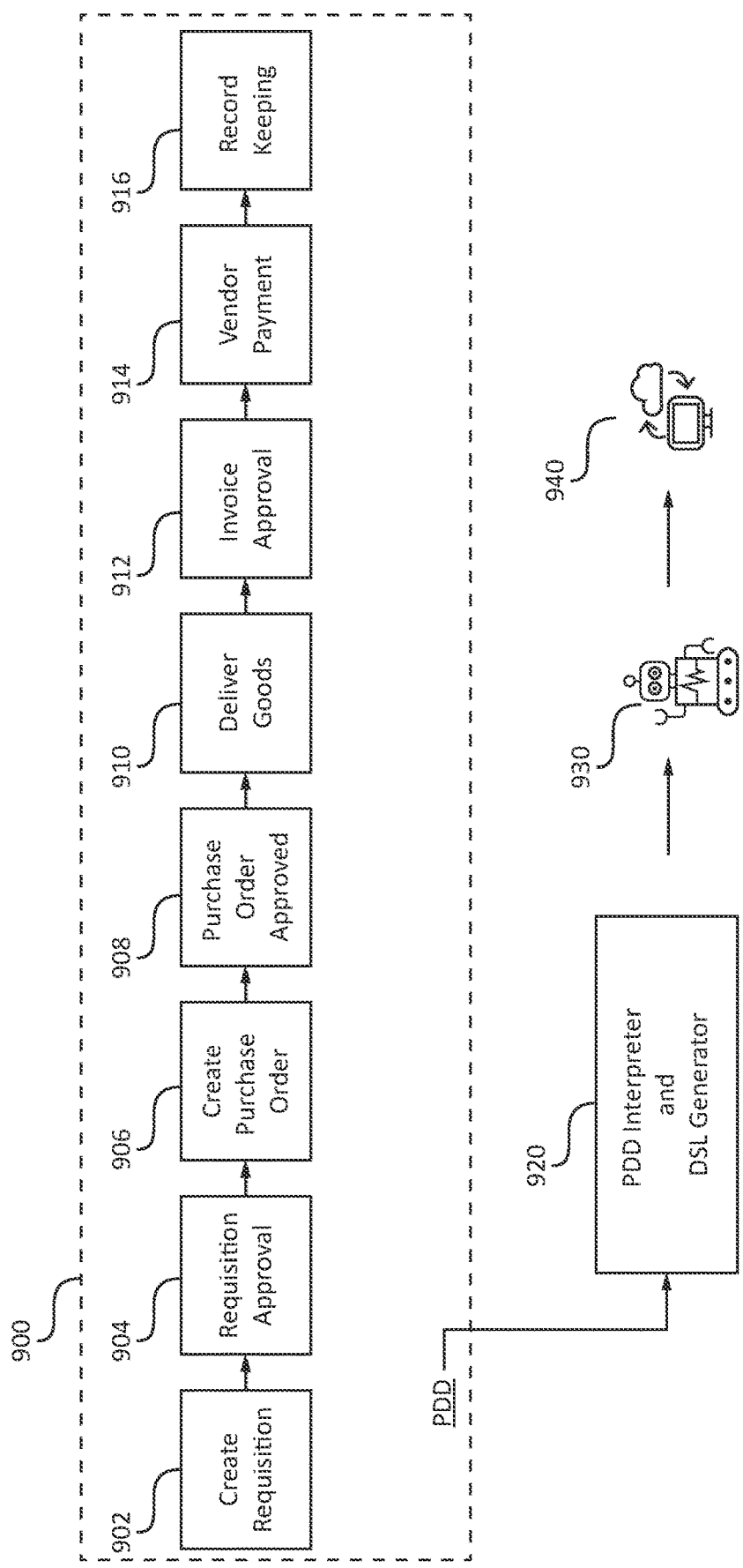
FIG. 9 is a block/flow diagram of an exemplary practical application pertaining to processing a purchase order by employing the RPA development with PDD by using a DSL-based validator, in accordance with an embodiment of the present invention.

FIG. 9 is a block/flow diagram of an exemplary practical application pertaining to processing a purchase order by employing the RPA development with PDD by using a DSL-based validator, in accordance with an embodiment of the present invention.

In one practical application 900, a requisition 902 is created, requisition approval 904 then takes place, and then a purchase order (PO) 906 is created. PO approval 908 and delivery of goods 910 then follows. Invoice approval 912, vendor payment 914 and record keeping 916 can be the following steps and the PO process. The PO process then goes through the PDD interpreter and DSL generator 920, which creates a PO bot 930 specialized for processing POs. The PO bot 930 can be deployed to a cloud 940 of the organization. As a result, PO automation can be achieved by employing the PO bot 930. The benefits of the automated PO system employing the PO bot 930 include at least faster processing, error-free processing, and real-time purchase order approval processing resulting in cost savings. Automating the rule-based, repetitive tasks of the PO process allows companies to have the accounting team focus on important matters, such as, e.g., tending to internal approvals, monitoring suspicious activities, and analyzing the financial reports.

Other practical applications include:

Website scrapping practical application, where RPA software can be used to extract data and content from websites. RPA bots can be used to extract data from top websites, trading websites, objects, and other sites with known data. It is easy to fetch this data and analyze it later. Some of the important advantages of web scrapping with RPA include automating mass download tasks, enabling fast and easy set up, tasks resulting in fewer errors and low cost, and no team is required to maintain scraping. The RPA development with PDD by using a DSL-based validator 10 can be utilized to further benefit website scrapping.

Call center operations practical application, where, with the help of the exemplary RPA technology employing a DSL-based validator, it is easy to assist customer requests received through call centers. Queries raised by customers and solutions can be passed to agents through a dashboard. When a problem escalates to customer service agents (human workers), the exemplary RPA helps to combine every relevant information associated with a customer on a single screen, thereby enabling agents to have all the information required from multiple systems to ideal and faultless service. The RPA development with PDD by using a DSL-based validator 10 can be utilized to further benefit call center operations.

Customer order processing practical application where a similar cycle is followed from beginning to end, whenever a customer places an order, only with some variations. Managing those tasks manually by using employees can be tedious and time-consuming, which can create more errors in the process. The exemplary RPA solutions can be programmed to manage customer order processing in order to reduce the error from the side of human workers, improve Return on Investment, lower costs, and improve customer satisfaction and experience. The RPA development with PDD by using a DSL-based validator 10 can be utilized to further benefit customer order processing.

Credit card applications practical application where the exemplary RPA bots are the backstage performers of most of the credit card application processes. RPA bots are programmed to manage every stage of the process, from collecting information and documents, conducting credit and background checks, making the final decision on whether the applicant is eligible to receive credit, and issuing an original card. The RPA development with PDD by using a DSL-based validator 10 can be utilized to further benefit processing of credit card applications.

In conclusion, RPA technology is changing how the world gets work done. Software robots, instead of people, do repetitive and lower-value work, like logging into applications and systems, moving files and folders, extracting, copying, and inserting data, filling in forms, and completing routine analyses and reports. Advanced robots can even perform cognitive processes, like interpreting text, engaging in chats and conversations, understanding unstructured data, and applying advanced machine learning models to make complex decisions. When robots do these types of repetitive, high-volume tasks, humans are freed to focus on the things they do best and enjoy more, that is, innovating, collaborating, creating, and interacting with customers. Enterprises get a boost too by achieving higher productivity, efficiency, and resilience. Enterprises in industries ranging from financial services to healthcare to manufacturing to the public sector to retail and far beyond can implement the exemplary RPA systems and methods advanced herein in areas as diverse as finance, compliance, legal, customer service, operations, and IT.

In conclusion, regarding FIGS. 2-9, the exemplary systems and methods disclose a novel technique for generating a RPA entity from templated content of a PDD. An AI model generated out of historical knowledge corpus that understands industry specific terms and business models can mediate the process of converting the PDD content to a structured automation step. In the meantime, another method consumes the output business processes from the earlier method to selectively pick automation unit steps in chosen automation languages to give shape to a complete business process workflow.

The mediator plays the role of PDD validator and continuously syncs the changes in the PDD by its author or any process modelling tools. When changes occur in the PDD, the RPA generator interface intercepts it to bring the AI model to validate the changes. If the changes are incongruent or incompatible with the DSL standard or other industry standard, the system raises a red flag to those portions of the PDD and further suggests probable right contents to accept by author if the same appears semantically correct to the author in terms of what he/she wanted to add as a change or modification. In an additional embodiment, the system and method captures user feedback to use for continuous learning purposes for providing better services in the future.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of methods and devices for achieving RPA development acceleration with a process document by using a domain specific language (DSL) validator (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method comprising:
preparing key actions in a process design document (PDD) from historical PDD documents by tokenizing the PDD with part-of-speech (POS) grammar against key verbs and phrases;
extracting automation unit pairs from the historical process documents to map the automation unit pairs with the key verbs and phrases;
constructing a set of automation tasks against one or more of the key verbs and phrases;
coupling different process models with domain verbs for the phrases to mark one or more of the automation unit pairs as actions against one or more of the key verbs;
constructing a tree-like mapping where each key action points to different actions in a target specific automation language; and
defining a vocabulary interface of a domain specific language (DSL) by using the key actions and phrases.

2. The method of claim 1, wherein the vocabulary interface includes standardizing the key actions and generating a DSL representation by converting the key actions to standard DSL verbs.

3. The method of claim 2, wherein the standard DSL verbs include at least ACCESS APPLICATION, LOGIN, INPUT, CLICK, and ENTER.

4. The method of claim 1, wherein the vocabulary interface includes standardizing key inputs and defining DSL NOUNS.

5. The method of claim 1, wherein the vocabulary interface includes analyzing complex logical flows within robotic process automation (RPA) codes and forming DSL conditional operators to handle the complex logical flows within the RPA codes.

6. The method of claim 5, wherein a DSL conditional operator is CLICK IF SELECTION IS PRESENT.

7. The method of claim 1, wherein a translator transforms a requirement into a corresponding DSL format.

8. The method of claim 7, wherein the transformed DSL format of the requirement uses the vocabulary interface to yield RPA codes for a given implementation platform.

9. The method of claim 1, wherein a PDD interpreter and DSL generator acting as a DSL validator is triggered when any changes are made to the PDD.

10. The method of claim 9, wherein the PDD interpreter and DSL generator flags any PDD discrepancies and provides suggestions to modify the PDD with compliant content.

11. A computer program product for implementing robotic process automation (RPA) acceleration, the computer program product comprising a computer readable storage medium having program instructions embodied therewith, the program instructions executable by a computer to cause the computer to:
prepare key actions in a process design document (PDD) from historical PDD documents by tokenizing the PDD with part-of-speech (POS) grammar against key verbs and phrases;
extract automation unit pairs from the historical process documents to map the automation unit pairs with the key verbs and phrases;
construct a set of automation tasks against one or more of the key verbs and phrases;
couple different process models with domain verbs for the phrases to mark one or more of the automation unit pairs as actions against one or more of the key verbs;
construct a tree-like mapping where each key action points to different actions in a target specific automation language; and
define a vocabulary interface of a domain specific language (DSL) by using the key actions and phrases.

12. The computer program product of claim 11, wherein the vocabulary interface includes standardizing the key actions and generating a DSL representation by converting the key actions to standard DSL verbs.

13. The computer program product of claim 12, wherein the standard DSL verbs include at least ACCESS APPLICATION, LOGIN, INPUT, CLICK, and ENTER.

14. The computer program product of claim 11, wherein the vocabulary interface includes analyzing complex logical flows within robotic process automation (RPA) codes and forming DSL conditional operators to handle the complex logical flows within the RPA codes.

15. The computer program product of claim 11, wherein a translator transforms a requirement into a corresponding DSL format.

16. The computer program product of claim 15, wherein the transformed DSL format of the requirement uses the vocabulary interface to yield RPA codes for a given implementation platform.

17. The computer program product of claim 11, wherein a PDD interpreter and DSL generator acting as a DSL validator is triggered when any changes are made to the PDD.

18. The computer program product of claim 17, wherein the PDD interpreter and DSL generator flags any PDD discrepancies and provides suggestions to modify the PDD with compliant content.

19. A system for implementing robotic process automation (RPA) acceleration, the system comprising:
   a memory; and
   one or more processors in communication with the memory configured to:
      prepare key actions in a process design document (PDD) from historical PDD documents by tokenizing the PDD with part-of-speech (POS) grammar against key verbs and phrases;
      extract automation unit pairs from the historical process documents to map the automation unit pairs with the key verbs and phrases;
      construct a set of automation tasks against one or more of the key verbs and phrases;
      couple different process models with domain verbs for the phrases to mark one or more of the automation unit pairs as actions against one or more of the key verbs;
      construct a tree-like mapping where each key action points to different actions in a target specific automation language; and
      define a vocabulary interface of a domain specific language (DSL) by using the key actions and phrases.

20. The system of claim 19, wherein a PDD interpreter and DSL generator acting as a DSL validator is triggered when any changes are made to the PDD, flags any PDD discrepancies, and provides suggestions to modify the PDD with compliant content.

* * * * *